United States Patent [19]

Bristow

[11] Patent Number: 6,152,077
[45] Date of Patent: Nov. 28, 2000

[54] BEDDING FOR LIVESTOCK

[76] Inventor: Alan E Bristow, Baynards Park Estate, Cranleigh, Surrey GU6 8EE, United Kingdom

[21] Appl. No.: 09/180,210
[22] PCT Filed: Apr. 22, 1997
[86] PCT No.: PCT/GB97/01115
   § 371 Date: Nov. 4, 1998
   § 102(e) Date: Nov. 4, 1998
[87] PCT Pub. No.: WO97/41723
   PCT Pub. Date: Nov. 13, 1997

[30] Foreign Application Priority Data

May 7, 1996 [GB] United Kingdom .................. 9609492

[51] Int. Cl.⁷ .................................................. A01K 1/015
[52] U.S. Cl. ........................... 119/28.5; 119/526; 5/655.5
[58] Field of Search ................................... 119/28.5, 526; 5/654, 655.5, 671, 706, 710, 665

[56] References Cited

U.S. PATENT DOCUMENTS

| | | |
|---|---|---|
| 3,426,891 | 2/1969 | Marks . |
| 3,533,095 | 10/1970 | Collins .................. 119/526 X |
| 4,065,819 | 1/1978 | Gorran . |
| 4,076,872 | 2/1978 | Lewicki et al. . |
| 4,121,310 | 10/1978 | Gorran . |
| 4,247,963 | 2/1981 | Reddi . |
| 4,459,714 | 7/1984 | Lin . |
| 4,491,089 | 1/1985 | Kelly et al. . |
| 4,860,395 | 8/1989 | Smith . |
| 5,152,018 | 10/1992 | Lea . |
| 5,195,199 | 3/1993 | Sereboff ...................... 5/654 |
| 5,632,051 | 5/1997 | Stanley et al. . |
| 5,669,092 | 9/1997 | Lin ............................. 5/706 |
| 5,911,657 | 6/1999 | Meiners ....................... 5/710 |

FOREIGN PATENT DOCUMENTS

| | | |
|---|---|---|
| 20088/70 | 3/1972 | Australia . |
| 118139 | 9/1984 | European Pat. Off. . |
| 2672966 | 8/1992 | France . |
| 2690046 | 10/1993 | France . |
| 9201643 | 4/1994 | Netherlands . |
| WO 8504550 | 10/1985 | WIPO . |
| WO 9613186 | 5/1996 | WIPO . |

OTHER PUBLICATIONS

Patent Abstract for Australian Patent Application No. AU–A–66696/90 entitled Improvements in Inflatable Adjustable Support Cushion.

Patent Abstract for Australian Patent Application No. AU–A–57889/86 entitled Inflatable Bed for Pets.

Primary Examiner—Robert P. Swiatek
Attorney, Agent, or Firm—Killworth, Gottman, Hagan & Schaeff, LLP

[57] ABSTRACT

A bed for livestock comprises a bladder expandable under internal fluid pressure acting upon at least one flexible supporting sheet defining a supporting area, such that when the bladder is expanded, the supporting sheet assumes a generally convex shape across the supporting area. The bladder may be situated between first and second flexible sheets laminated one above the other, at least one of which is the supporting sheet. A preferred method of using the beds comprising selecting a fluid pressure or fluid volume within the bladder appropriate to a particular animal such that the point loading of that animal's foot, when standing, will press the supporting sheet into frictional contact with a stable base whereas, when the animal lies down, fluid within the bladder will be distributed such that substantially all parts of the animal's body are separated from the base by the fluid within the bladder. Integral groups of such beds are disclosed, preferably in the form of an elongate strip that can be supplied in a roll to be simply unrolled upon installation and held down by battens.

24 Claims, 4 Drawing Sheets

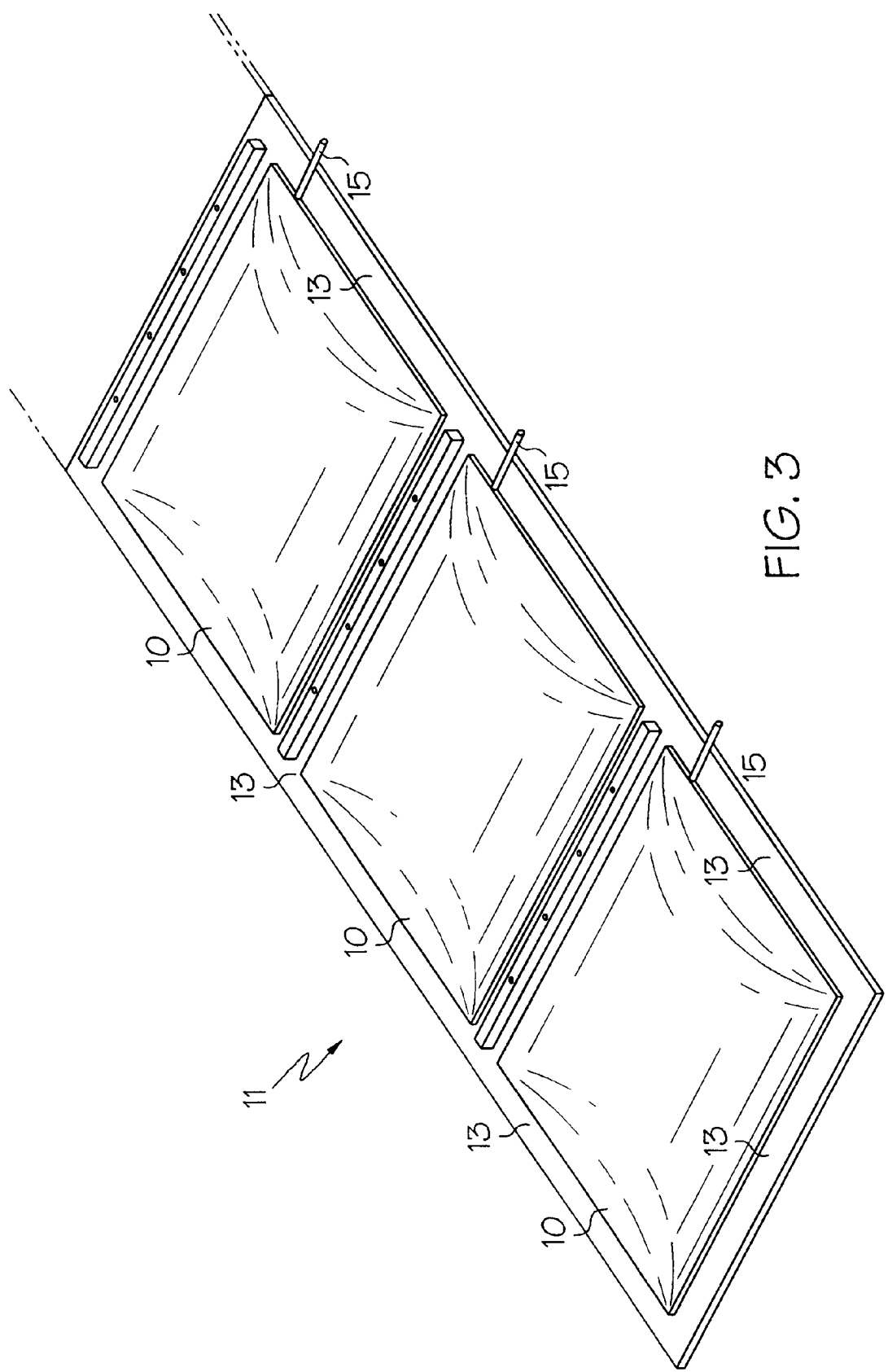

BEDDING FOR LIVESTOCK

This invention relates to bedding for livestock such as cattle and horses.

Ever since animal husbandry began in prehistoric times, farmers have recognized the importance of shelter and bedding in the comfort and well-being of their livestock. The predominant form of bedding has always been straw, largely in view of its ready availability to farmers who have historically obtained straw from their own land. It is, of course, also entirely possible to bring in straw from elsewhere; this option is becoming increasingly common.

In modern farming, straw bedding is typically spread in a thick layer upon a solid floor of concrete or stone in a suitable shelter. The shelter may, for example, house a covered straw yard, within which animals can congregate and move relatively freely, or rows of cubicles, within which animals are segregated side-by-side. The straw cushions the floor, affording warmth, support and hence comfort to a recumbent animal through the creation of an ergonomic shape corresponding to the shape and weight distribution of the animal. The straw also absorbs the animal's excreta in the form of feces and urine and so, for reasons of hygiene, it must be removed and replaced with fresh straw after the animal has used the bedding for a few days.

Straw is a renewable natural resource that can be recycled after use by being spread onto and ploughed into fields, for example in addition to slurry including processed animal excreta washed from the animal shelter when the soiled straw is removed. However, renewing and recycling straw is expensive in view of the sheer volume of straw that is required to run a large farm. By way of illustration, the Inventor's herd of between three and four hundred cows incurs straw costs currently in excess of £40,000 per annum: well over £100 per cow per year.

The cost of the straw itself is not the only cost associated with the use of straw; the labor costs involved in handling straw before and after use, together with storage and transport costs before use and recycling costs after use, all militate against the use of straw.

In recent years, recycled rubber material has been used in the form of flexible matting as a component of animal bedding but this still requires the use of straw for cushioning purposes.

In view of these drawbacks, the Inventor has investigated other forms of animal bedding with the aim of finding bedding that does not employ straw and that has a fifteen- to twenty-year service life, and has alighted upon fluid-filled beds as an alternative to straw. His investigations have revealed that a fluid-filled bed has already been proposed specifically for the care of piglets, but that this prior proposal is deficient in several respects.

Specifically, a water bed for piglets is disclosed in a French patent application published in 1992 under the serial number 2,672,966 in the name of Galvelpor S. A. In Galvelpor's patent application, the water bed comprises a labyrinthine channel of resilient tubes through which heated water flows, the purpose of the labyrinth being to equalize temperature across the bed. The tubes lie upon a rigid insulating base in side-by-side disposition connected at their ends, and may be covered by a metal plate, for example of aluminum, so that the tubes will not be flattened (which would restrict the flow of water) or damaged if the bed is used for older and thus heavier animals.

Galvelpor's water bed would be quite unsuitable for use as bedding for livestock as a substitute for straw, even if it was scaled up in size. For instance, as the metal plate must be substantially rigid, the emphasis of Galvelpor's water bed is clearly upon heating rather than comfort. If the metal plate of Galvelpor's water bed is removed to expose the resilient upper surface defined by the tubes, it will be noted that the upper surface undulates in a series of valleys which would retain excreta to the detriment of comfort, cleaning and hygiene. Furthermore, as noted above, a heavy animal lying on the bed would flatten the tubes and prevent water flowing through them, thus undermining the heating effect that is the main purpose of Galvelpor's water bed and negating whatever supporting effect it may have.

Further, as Galvelpor's water bed requires a continuous flow of warm water, it requires inlet and drainage plumbing, suffers from high water consumption, and requires the maintenance of a minimum water pressure in the water supply.

The Inventor has devised the present invention without prior knowledge of Galvelpor's water bed.

From one aspect of the invention, a bed for livestock comprises a bladder expandable under internal fluid pressure acting upon at least one flexible supporting sheet defining a supporting area, such that when the bladder is expanded, the supporting sheet assumes a generally convex shape across the supporting area. The smoothly convex shape causes excreta and other fluids to flow off the bed.

The bladder may be situated between first and second flexible sheets laminated one above the other, at least one of which is the supporting sheet. This aspect of the invention provides a simple and effective form of construction.

It is preferred that the supporting sheet curves into a shallow pillow-like shape when the bladder is expanded. The or each supporting sheet suitably has a depressed marginal portion beside or around the supporting area, at which the or each supporting sheet may be bonded to a base or to each other. The depressed marginal portion can define a drainage channel to carry excreta off the bed.

For simplicity of construction, it is preferred that the bladder is at least partially defined by the or each supporting sheet, the supporting sheet thus being an impermeable wall of the bladder.

For reversibility and thus for a longer working life, the bed preferably comprises first and second supporting sheets which are substantially identical to one another. The or each supporting sheet may have a non-slip outer wearing surface to give animals a secure footing and thus the confidence to use the bed.

The or each supporting sheet is suitably of a rubberized belting material, which is preferably polyurethane-based for long life.

A pipe suitably communicates with the bladder to admit fluid to the bladder and a valve associated with the pipe can be set to prevent fluid flowing out of the bladder. When the valve is open, the same pipe may be used to drain fluid from the bladder.

In order that the bed can be adjusted to suit different animals of different sizes, it is preferred that the valve is adjustable to vary the water pressure within the bladder.

To instil confidence in an animal by providing a secure footing, the bed should be so arranged and should contain fluid under such pressure that the point loading of a standing animal's foot presses the supporting sheet into frictional contact with a stable base (such as the other supporting sheet which lies upon the floor) whereas, when the animal lies down, fluid within the bladder is distributed such that all or substantially all parts of the animal's body are separated from the base by the fluid within the bladder.

For the protection of animals lying on adjacent beds, a peripheral upstanding divider such as a batten is preferably situated at the aforementioned depressed marginal portion. Fastenings may extend from a divider through the sheets and into a floor on the other side of the bed.

The invention also encompasses an integral group of beds as defined above, connected together. For simplicity and ease of manufacture, the or each supporting sheet is preferably continuous across the group.

The beds can be disposed in various ways within the group, but it is preferred that the beds are disposed side-by-side to form an elongate strip. The strip can be rolled up into a relatively compact configuration for storage and transportation, to be unrolled upon installation.

Where the aforementioned dividers are used in a group of beds, adjacent beds are conveniently separated by a divider.

Each bed in a group preferably has an individual adjustable valve permitting the fluid pressure within its bladder to be varied independently of the fluid pressure in the other bladders within the group. Nevertheless, all of the bladders can be connected by a manifold to a common water supply.

The invention extends to a method for supporting livestock upon a bed or group of beds as defined above, comprising selecting a fluid pressure or fluid volume within the bladder appropriate to a particular animal such that the point loading of that animal's foot, when standing, will press the supporting sheet into frictional contact with a stable base whereas, when the animal lies down to spread the loading of its weight, fluid within the bladder will be distributed such that all or substantially all parts of the animal's body are separated from the base by the fluid within the bladder.

When applied to supporting a plurality of animals upon a group of beds, the method suitably comprises selecting a different fluid pressure within each bed of the group.

In order that this invention can be more readily understood, reference will now be made, by way of example, to the accompanying drawings. For the purposes of illustrating the invention with brevity, the description hereafter will refer to its preferred application as bedding for cows. It is to be understood, however, that the broad concept of the invention is not limited to use with cows but can encompass other livestock such as horses.

In the drawings:

FIG. 3 is a top perspective view corresponding to FIG. 1 but showing the cow beds in an expanded state;

Figure 1:
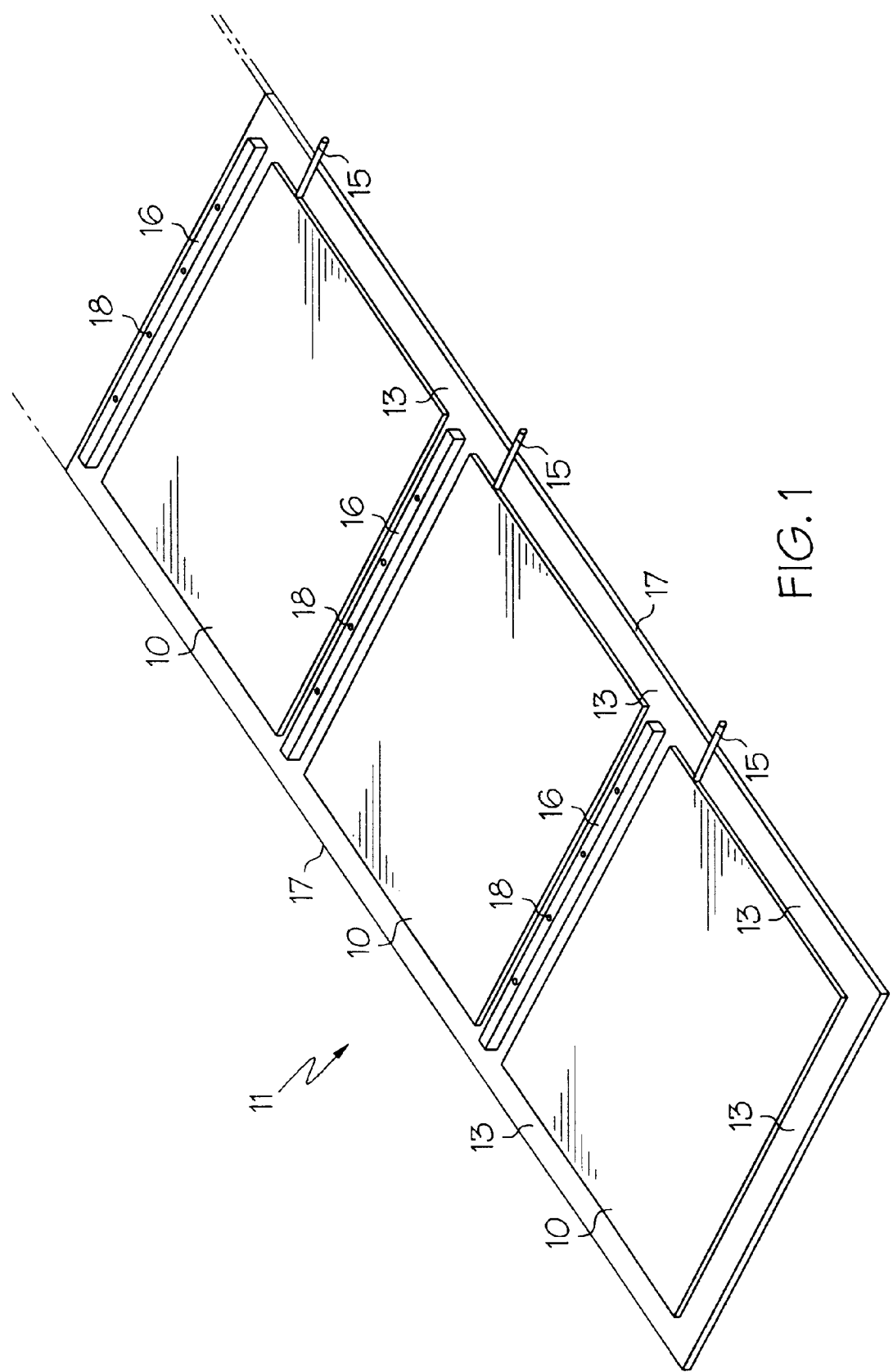
FIG. 1 is a top perspective view showing a preferred embodiment of the invention an integral group of cow beds in the form of a strip-in a contracted state.

Referring firstly to FIG. 1 of the drawings, a plurality of rectangular cow beds 10 are connected together in an integral group disposed side-by-side in a linear array to form an elongate rectangular strip 11. The strip 11 can be of any practical length determined by the number of beds 10 that it contains and by their individual dimensions. A preferred length for the strip 11 is approximately forty-five meters containing, for example, thirty-two beds 10 each about 1.4 meters across; the strip 11 itself is about 2.3 metres across, meaning that each bed 10 in this example has a total plan area of about 2.3×1.4 meters.

These measurements are not essential to the invention and can be varied for differently-sized cows-for example, a variant having beds 10 with an area of approximately 2.0 square meters is also contemplated-or indeed for different species of animal.

The strip 11 is designed for use within a shelter on a continuous floor shared by a row of cubicles (not shown). The strip 11 lies on the floor extending along the row of cubicles under the structures, such as stalls, that define the respective cubicles, and is so positioned that one bed 10 is aligned with each cubicle.

Figure 2:
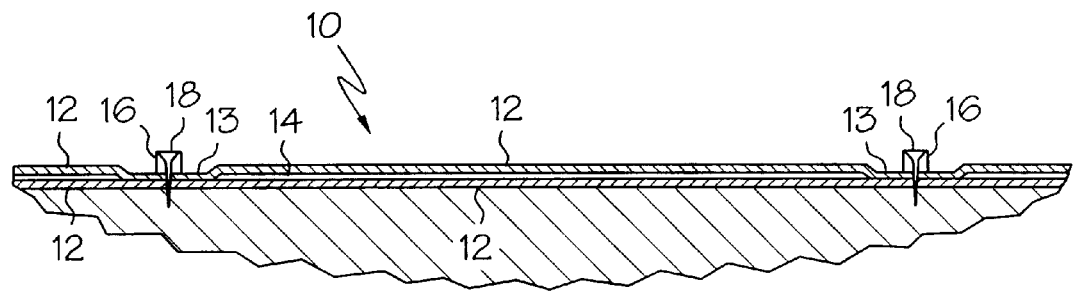
FIG. 2 is a partial schematic longitudinal cross section of the strip of FIG. 1.

Referring now also to FIG. 2 of the drawings, it will be seen that the strip 11 is a laminate of two flexible and impermeable sheets 12 which are bonded together around the margins 13 of each bed 10 by adhesives, such as mastic, or vulcanizing to define a bladder 14 at the centre of each bed 10. The bladders 14 are shown in a contracted state in FIGS. 1 and 2. Each bed 10 also includes a pipe 15 of metal or plastics material bonded into and sealed to the strip 11. The pipe 15 communicates with the bladder 14 to admit water to, and to drain water from, the bladder 14 via a valve when desired.

The outer wearing surface of each sheet is somewhat rough to provide non-slip qualities. It will be noted that the sheets 12 are identical, allowing the strip 11 to be inverted in use to present a fresh wearing surface and thus to prolong the working life of the strip 11.

The beds 10 are separated by battens 16 that extend across the strip 11 terminating just short of the long edges 17 of the strip 11. Screws or bolts 18 extend through a batten 16 through the strip 11 and into a floor 19 on the other side of the strip 11. The battens 16 are preferably of hardwood and may, for example, be of 50 mm×50 mm square cross-section.

As cows tend to lie down with at least their hind legs to one side, the battens 16 help to prevent the hooves of a cow lying on a bed 10 slipping across onto the adjacent bed 10 and possibly causing udder damage or other injury to a cow lying on the adjacent bed 10.

The sheets 12 are of a flexible synthetic rubberized belting material, preferably polyurethane-based, similar to the material used for moving walkways and other continuous belts. As such, the strip 11 can be rolled up for compact storage and easy transportation and is simply unrolled along the floor upon installation whereupon the strip 11 is held down by fastening the battens 16 to the floor 19 through the strip 11 by means of fastenings 18. This job requires only unskilled labor. The strip 11 can be lifted from the floor 19 by removing the battens 16 and rolled up after use with similar ease.

Figure 4:
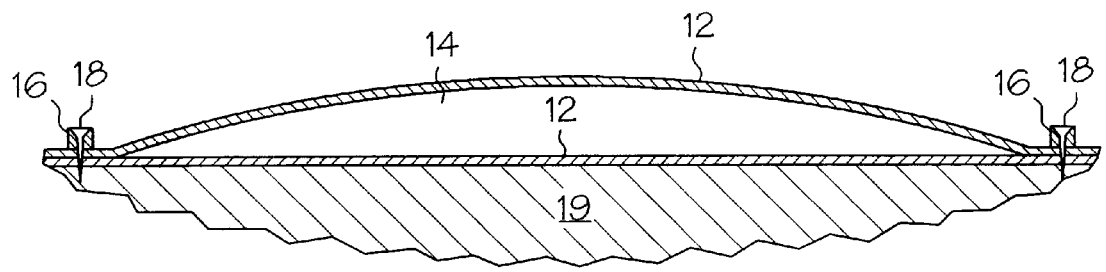
FIG. 4 is a partial schematic longitudinal cross section of the strip of FIG. 3.

Referring now to FIGS. 3 and 4 of the drawings, the bladder 14 expands when water is introduced under pressure through the pipe 15, the lower sheet 12 bearing against the floor 19 to define a flat base and the upper sheet 12 curving into a convex shallow part-elliptical pillow-like shape (somewhat exaggerated in FIG. 4).

Valves (not shown) associated with the pipes 15 prevent water flowing back out of the bladder 14 until it is desired to drain the bladder 14 after use. The valves are preferably adjustable so that the water pressure within the bladder 14 and thus its supporting ability can be adjusted to suit any weight of cow. It is further preferred that each bladder 14 has an individual adjustable valve so that the water pressure within a bladder 14 can be varied independently of the water pressure in the other bladders 14 within the strip 11, even if all of the bladders 14 are connected to a common water supply using a suitable manifold. In this way, the strip 11 can be used simultaneously by cows of substantially differing weights.

It is important that a bed 10 instils confidence in a cow which otherwise would be reluctant to use the bed 10. To this end, the bed 10 responds differently when a cow stands on the bed 10, as shown in FIG. 5 of the drawings, to when a cow lies on the bed 10, as shown in FIG. 6.

Figure 5:
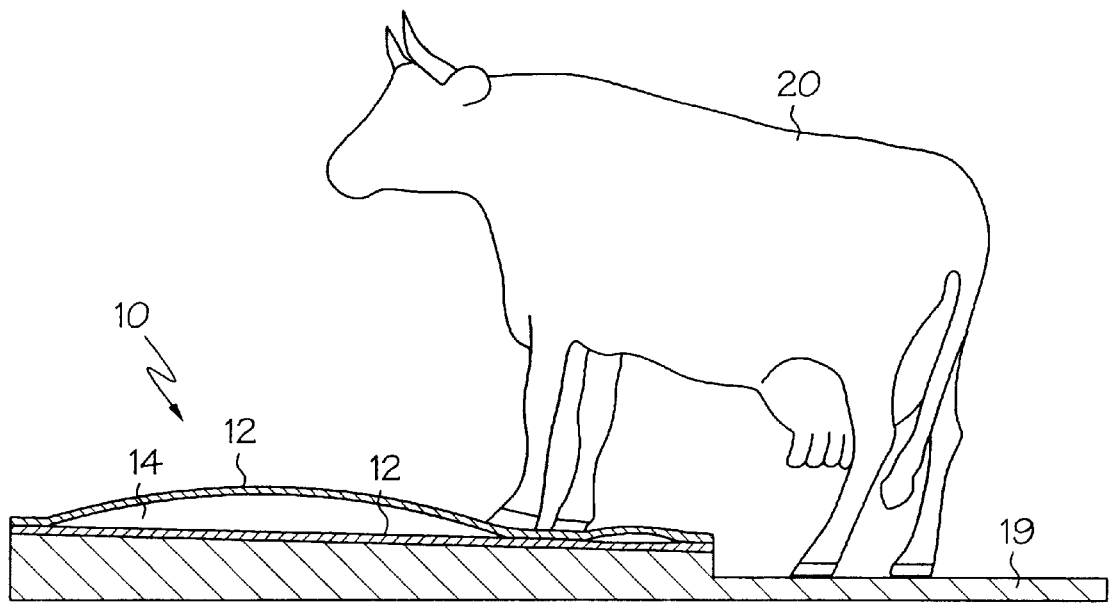
FIG. 5 is a schematic transverse cross-section showing the cow bed when a cow stands upon it.

When a cow 20 first walks onto the bed 10 applying one or more of its hooves to the bed 10, as shown in FIG. 5, before it eventually lies down, the high-pressure point loading of a hoof presses the upper sheet 12 firmly into frictional contact with the lower sheet 12 which therefore provides a stable footing between the hoof and the floor 19.

Figure 6:
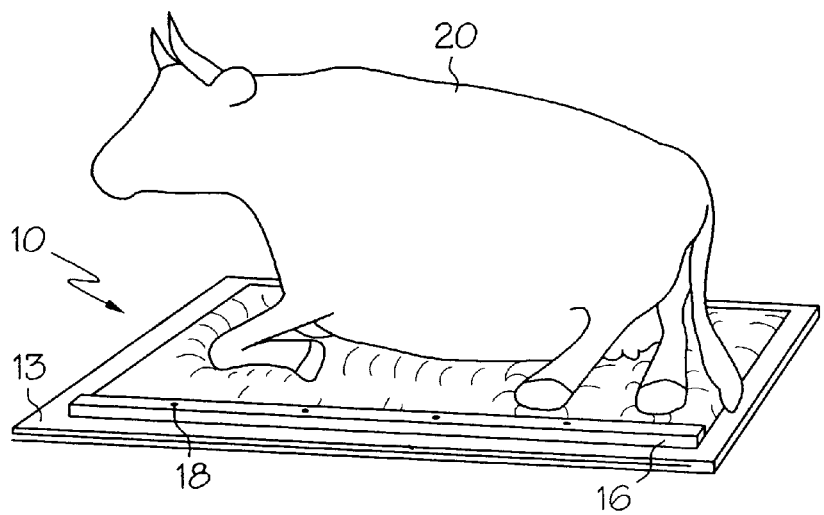
FIG. 6 is a schematic perspective view showing the cow bed when a cow lies upon it.

In contrast, when the cow 20 lies down as shown in FIG. 6, the bulk of its body spreads the loading of its weight, re-distributing the water held within the bladder 14 to cause the upper sheet 12 to mould to the contours of the cow's body. The bladder 14 thus adopts a comfortably supporting configuration in which all or substantially all parts of the cow's body are separated from the floor 19 by a cushioning layer of water. Apart from its ergonomic characteristics and cushioning effect, the water-filled bladder 14 stores heat from the cow's body and insulates the cow 20 from the colder floor 19.

The comfort of the bed 10 derived from its cushioning and insulating effect means that there is no need to use straw, unlike the flexible matting of the prior art.

When the cow 20 stands up on the bed 10, the bed 10 assumes the state shown in FIG. 5 for stability and then, when the cow 20 walks off the bed 10, the upper sheet 12 of the bed 10 reverts to the convex shape shown in FIG. 4. The convex shape promotes the flow of fluids and excreta off the bed 10 under gravity, to the benefit of hygiene. This shaping and the impermeable material of the bed 10 thus make for easy cleaning; the bed 10 can simply be steam cleaned or hosed down occasionally after a cow has used it, the margins 13 defining drainage channels that lead the fluids and excreta into a slurry channel for further processing and storage.

It is envisaged that a suitable belting material will give a continuous working life of at least fifteen years, permitting a very substantial saving in straw costs while promoting the comfort and well-being, and reducing injury, of many animals during the life of the product.

Many variations are possible. For example, the beds need not be grouped together as described; they could be individual units, or the group could be arranged other than in a linear array.

Further, if the provisions for reversibility and rolling-up are not required, the beds may have a substantially rigid base. In this case, the base could even be integral with or formed by the floor of a shelter; the floor may, for example, be shaped to define a recess covered by a flexible sheet to define a bladder.

The battens are also merely an optional feature of the invention in its broadest sense; dividers other than battens are, of course, possible and may include integral formations molded into or bonded to the bed.

Indeed, the present invention may be embodied in many other specific forms without departing from its essential attributes.

What is claimed is:

1. A bed for livestock comprising a bladder which is expandable under internal fluid pressure acting upon at least one flexible supporting sheet defining a supporting area such that when said bladder is expanded by filling with fluid, said at least one supporting sheet assumes a generally convex shallow pillow-like shape across said supporting area, said fluid pressure being such that the point loading of a standing animal's foot presses said at least one supporting sheet into frictional contact with a stable base whereas, when said animal lies down, fluid within said bladder is distributed such that substantially all parts of said animal's body are separated from said base by said fluid within said bladder.

2. A bed as claimed in claim 1, wherein said bladder is between said first and second flexible supporting sheets laminated one above the other.

3. A bed as claimed in claim 2, wherein said first and second supporting sheets are substantially identical to one another.

4. A bed as claimed in claim 1 wherein said at least one supporting sheet has a depressed marginal portion beside or around said supporting area.

5. A bed as claimed in claim 4 wherein said at least one supporting sheet is bonded around said depressed marginal portion.

6. A bed as claimed in claim 4 further including a peripheral upstanding divider situated at said depressed marginal portion.

7. A bed as claimed in claim 6 wherein fastenings extend from said divider through said at least one supporting sheet and into a floor supporting said bed.

8. A bed as claimed in claim 1 wherein said bladder is at least partially defined by said at least one supporting sheet.

9. A bed as claimed in claim 1 wherein said at least one supporting sheet has a non-slip outer wearing surface.

10. A bed as claimed in claim 1 wherein said at least one supporting sheet comprises a rubberized or plastic material.

11. A bed as claimed in claim 1 wherein a pipe communicates with said bladder to admit fluid to the bladder and a valve associated with said pipe is capable of preventing fluid from flowing out of said bladder.

12. A bed as claimed in claim 11 wherein said pipe is capable of draining fluid from said bladder.

13. A bed as claimed in claim 11 wherein said valve is adjustable to vary fluid pressure within said bladder.

14. A bed as claimed in claim 1 further including a peripheral upstanding divider.

15. A bed as claimed in claim 1 wherein said bladder contains fluid therein.

16. A bed as claimed in claim 1 being one of an integral group of said beds connected together.

17. A bed as claimed in claim 16 wherein said at least one supporting sheet is continuous across said group of beds.

18. A bed as claimed in claim 16 wherein said group of beds are disposed side-by-side to form an elongate strip.

19. A bed as claimed in claim 18 wherein said strip can be rolled up into a relatively compact configuration.

20. A bed as claimed in claim 18 wherein adjacent beds are separated by at least one upstanding divider.

21. A bed as claimed in claim 16 wherein each bed in said group of beds has an individual adjustable valve permitting the fluid pressure within its bladder to be varied independently of the fluid pressure in the other bladders within said group.

22. A bed as claimed in claim 16 wherein each of the bladders in said group of beds are connected by a manifold to a common water supply.

23. A method of supporting livestock upon a bed comprised of a bladder which is expandable under internal fluid pressure and at least one flexible supporting sheet defining a supporting area, said method comprising the step of selecting a fluid pressure or fluid volume within said bladder appropriate to a particular animal such that the point loading of said animal's foot, when standing, will press said supporting sheet into frictional contact with a stable base whereas, when said animal lies down, fluid within said bladder will be distributed such that substantially all parts of the animal's body are separated from said base by said fluid within said bladder.

24. The method of claim 23 wherein an integral group of said beds are connected together, and wherein a different fluid pressure is selected for each bed of said group.

* * * * *